US008444214B2

(12) United States Patent
Helferty et al.

(10) Patent No.: US 8,444,214 B2
(45) Date of Patent: May 21, 2013

(54) BAFFLE WITH SELF-CLOSING FLAP ASSEMBLY

(75) Inventors: Raymond D. Helferty, Macomb, MI (US); Taylor S. Robertson, Oxford, MI (US)

(73) Assignee: Sika Technology AG, Baar (CH)

( * ) Notice: Subject to any disclaimer, the term of this patent is extended or adjusted under 35 U.S.C. 154(b) by 77 days.

(21) Appl. No.: 13/226,104

(22) Filed: Sep. 6, 2011

(65) Prior Publication Data

US 2013/0055638 A1    Mar. 7, 2013

(51) Int. Cl.
*B60N 99/00* (2006.01)
(52) U.S. Cl.
USPC .................................. 296/193.06; 296/187.02
(58) Field of Classification Search
USPC ......................................... 296/187.02, 193.06
See application file for complete search history.

(56) References Cited

U.S. PATENT DOCUMENTS

| 3,919,370 | A * | 11/1975 | Cotterell | 264/45.4 |
| 6,920,693 | B2 * | 7/2005 | Hankins et al. | 29/897.2 |
| 7,249,415 | B2 * | 7/2007 | Larsen et al. | 29/897.2 |
| 7,290,828 | B2 * | 11/2007 | Kosal et al. | 296/187.02 |
| 7,313,865 | B2 * | 1/2008 | Czaplicki et al. | 29/897.2 |
| 7,726,442 | B2 * | 6/2010 | Belpaire | 181/237 |
| 7,784,186 | B2 * | 8/2010 | White et al. | 29/897.2 |
| 7,950,723 | B2 * | 5/2011 | Vilcek et al. | 296/187.02 |
| 8,215,704 | B2 * | 7/2012 | Monnet et al. | 296/187.02 |
| 8,276,974 | B2 * | 10/2012 | Vilcek et al. | 296/187.02 |
| 2006/0043772 | A1 * | 3/2006 | Richardson | 296/187.02 |
| 2008/0111394 | A1 * | 5/2008 | Lewis | 296/187.02 |
| 2009/0001758 | A1 * | 1/2009 | Hanley, IV et al. | 296/187.02 |

FOREIGN PATENT DOCUMENTS

WO    WO 2009124177 A1 * 10/2009

\* cited by examiner

*Primary Examiner* — Lori Lyjak
(74) *Attorney, Agent, or Firm* — Rader, Fishman & Grauer PLLC

(57) ABSTRACT

Exemplary baffles for inhibiting noise transmission through a pillar structure, and exemplary methods of making the same, are disclosed. An exemplary baffle may include a body configured to be secured in a cavity, the body defining a passage for selectively receiving a line extending through the body. The baffle may further include an expandable material extending substantially about a perimeter of the passage. The expandable material may be configured to expand to seal the cavity about the body. The body may include a flap configured to open to allow the line to extend through the passage. The body may further include a biasing element urging the flap toward a closed position, substantially obstructing the passageway.

20 Claims, 5 Drawing Sheets

BAFFLE WITH SELF-CLOSING FLAP ASSEMBLY

BACKGROUND

Expandable baffles may be used in pillar structures of vehicles to reduce noise that may attenuate in the pillars during operation of the vehicles. For example, an expandable baffle may employ an expandable material that expands to generally fill a cross-section of a cavity or pillar structure, thereby reducing the transmission of noise through the pillar.

Increasingly, vehicle manufacturers use pillar structures of vehicles for routing hoses or other lines between a roof structure of the vehicle and areas of a vehicle beneath the pillars. This results in difficulties during assembly and/or service of the vehicles, as the baffles typically must obstruct substantially all of a particular cross-section of the pillar cavity in order to provide desired noise attenuation, and thereby may also obstruct passage of a hose or line through the same cross-section.

Baffles have therefore been developed that provide a tunnel or passage for hoses or other lines to be routed through, around which an expandable baffle seals the space between the aperture and the pillar structure. Baffles have been developed with body structures defining a passageway for a drain hose or other line, but such baffles necessarily lose a portion of their noise attenuation capabilities due to the open passage. A more recent baffle construction includes two flap portions that are initially locked in a closed position, thereby obstructing the passage. The flaps may be unlocked and opened during assembly of the vehicle, when a drain hose is inserted through the aperture, thereby releasing the locking mechanism and allowing passage of the drain hose through the baffle assembly.

A difficulty still exists, however, should it be necessary to remove the drain tube, such as when a tube or line is incorrectly installed, or must be removed or replaced, e.g., for service. The flaps of the above-described baffle, once unlocked, cannot be accessed in the pillar to re-lock the flaps together. As a result, noise transmission through the pillar increases as a result of the open passage through the baffle. The locking mechanism may also be subject to inadvertent opening in vehicles where it is desired to remain closed, e.g., vehicles that do not have certain options requiring the placement of a drain hose or line in the pillar structure, resulting in the same increase in noise transmission.

Accordingly, there is a need for an improved baffle that offers increased resistance to potential manufacturing errors and additional flexibility to allow for selective insertion and removal of lines or hoses in a pillar, while offering robust noise attenuation.

SUMMARY

An exemplary baffle may include a body configured to be secured in a cavity, the body defining a passage for selectively receiving a line extending through the body. The baffle may further include an expandable material extending substantially about a perimeter of the passage. The expandable material may be configured to expand to seal the cavity about the body. The body may include a flap configured to open to allow the line to extend through the passage. The body may further include a biasing element urging the flap toward a closed position, substantially obstructing the passageway.

An exemplary method of forming a baffle may include providing a body configured to be secured in a cavity, including defining a passage extending through the body for selectively receiving a line. The method may further include securing an expandable material about a perimeter of the passage, the expandable material configured to expand to seal the cavity about the body, and forming a flap and biasing element in the body. The flap may be configured to open to allow the line to extend through the passage, while the biasing element urges the flap toward a closed position substantially obstructing the passageway.

DETAILED DESCRIPTION

Referring now to Figures, exemplary baffles are illustrated in a pillar assembly of a vehicle. The pillar assemblies substantially comprised a plurality of interconnected panels or other structural elements that define a cavity through which a cavity line, e.g., a drain hose, electrical line, mechanical cable, or the like, may be passed. The pillar structures may generally define in part a vehicle structure (not shown), including a passenger compartment, doorways, and windows of the vehicle.

Referring now to FIGS. 1-5, an exemplary baffle 102 is illustrated, which may be installed in a pillar structure 100 of a vehicle. While the pillar structure 100 is generally illustrated as a forwardmost pillar or "A-pillar" of a vehicle body (not shown), baffle 102 may be adapted for use in any pillar structure or other cavity that is convenient. Moreover, exemplary baffles may be utilized in any other article of manufacture for sealing a cavity within the article while providing a passage through the cavity, e.g., for drainage of the cavity or passage of other lines or hoses.

Figure 1:
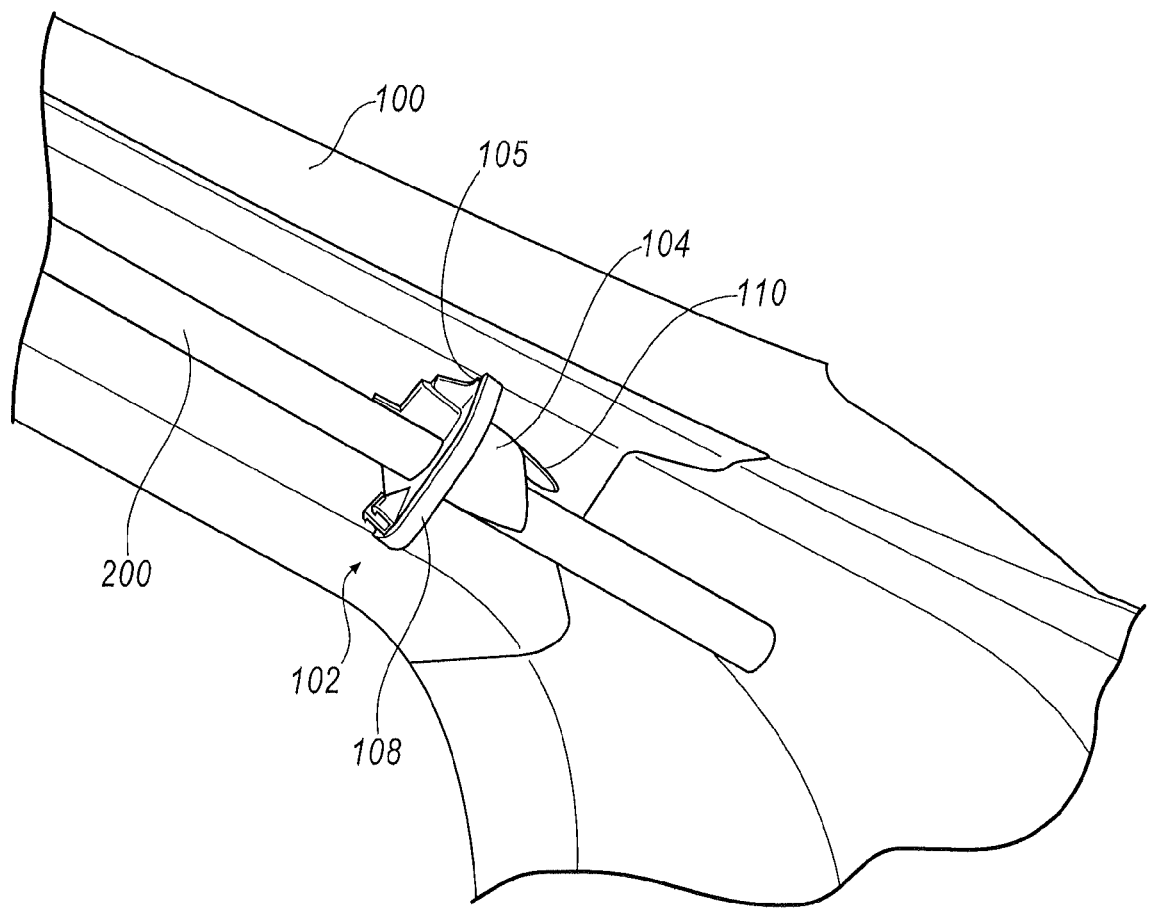
FIG. 1 illustrates a partial cutaway perspective view of an exemplary self-closing expandable baffle.
Figure 4:
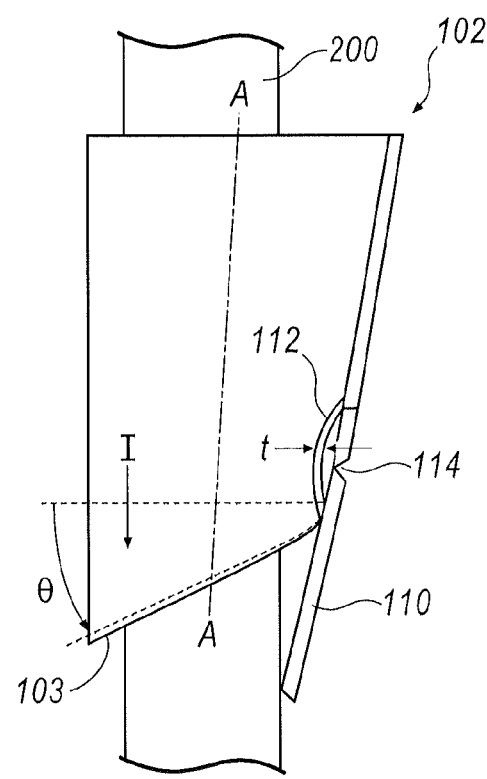
FIG. 4 illustrates a side view of the exemplary baffle of FIGS. 1-3 in the open position of FIG. 3.

Baffle 102 may generally include a body 104 defining an elongated aperture or passageway 106 extending along an axis A-A of the body (see FIG. 4). The body 104 may be selectively secured to a cavity or pillar structure 100, e.g., by way of an attachment member 101. As best seen in FIG. 1, the body 104 extends between a flange 105 and a chamfered end 103. The baffle may also include an expandable material 108 disposed about a perimeter of the body 104. The expandable material 108 may be expanded after installation into the structure 100, thereby substantially sealing the structure 100 across a cross-section of the cavity including the passage 106. As best seen in FIG. 1, the expandable material 108 may be secured to the flange 105. The flange 105 may generally direct expansion of the expandable material 108 outwardly from the body 104 and against adjacent interior surfaces of the pillar structure 100.

The passage 106 may be configured to receive a line or hose 200 that is inserted into the passage 106. In one exemplary illustration, the hose 200 is a drain hose 200, e.g., as commonly employed to facilitate drainage of water from a sunroof in an upper roof structure of a vehicle downward toward the ground and out of the vehicle structure. In other examples, electrical lines or other hoses, cables, or the like may be inserted into the passage 106. In practice, the hose 200 may be inserted into the aperture 106 from a distance, e.g., at an end of the pillar structure 100, such that the hose 200 is threaded through the passage 106. The passage 106 may be generally elongated along an axis A-A of the passage 106, thereby facilitating insertion of the hose 200 into and through the passage 106 and/or baffle 102. As best seen in FIG. 4, the hose 200 may be inserted into the passage 106 in a direction I, i.e., from an upper end of the pillar structure 100.

Figure 5:
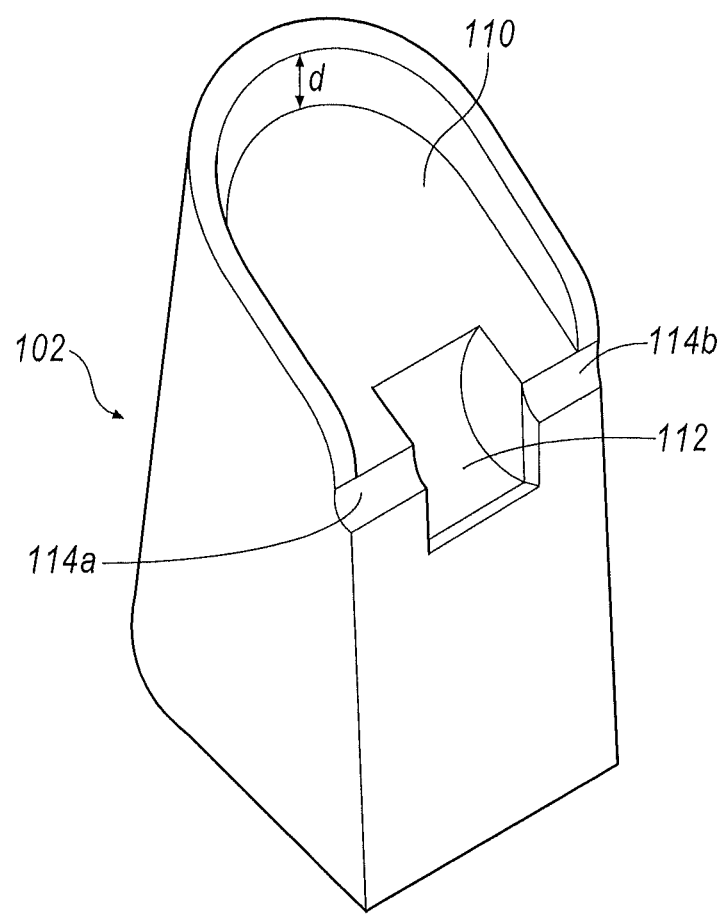
FIG. 5 illustrates a bottom perspective view of the exemplary baffle of FIGS. 1-4 in a closed position wherein a passage of the baffle is obstructed.

The baffle 102 may also include a flap 110 at the distal end of the body 104. As best seen in FIGS. 2-5, the flap 110 may be secured to the body 104 via two hinges 114*a*, 114*b*. In one exemplary illustration, the flap 110 is formed integrally with the body 104, e.g., of a plastic material, and the membranes 114*a*, 114*b* are formed as thinned portions of the plastic material, e.g., as "living" hinges. Accordingly, the hinges 114 may facilitate pivoting of the flap 110 with respect to the body 104. As best seen in FIG. 5, the hinges 114 may each be "reversed" such that they each define an arc extending toward an interior portion of the body 104 and/or the passage 106. Although forming the hinges 114 in an opposite configuration, i.e., such that the hinges 114 arc away from the body 104, is alternatively possible, positioning the hinges 114 in the reversed configuration illustrated in FIGS. 1-5 may advantageously improve a tendency of the flap 110 to remain closed where the body 104 is formed in a plastic molding process.

More specifically, as a molten material in an injection molding tool cools, the material necessarily will generally shrink to some degree. An amount of shrinkage and the rate at which a portion of an injection molded part shrinks will depend partly upon a temperature profile as the portion of the part cools. This profile is influenced by the tool condition, e.g., how uniformly the tool steel temperature can be maintained, and variations in thickness in the part being molded, as examples. For example, if the part has significant variations in thickness, it will cool within itself at varying rates, and hence shrink in varying degrees across itself. This phenomenon often results in warpage across the part and is especially difficult since a properly aligned or straight part is desired, but surface features such as ribs and bosses may need to be added, e.g., to improve stiffness of the part. These surface features then introduce variations in the part geometry (specifically thickness) that causes the part to want to warp when molded. This also accounts for what is referred to as "sink," i.e., where the surface depresses, caves-in, or otherwise shrinks more than the surrounding surface when a boss or other rib feature is under the surface. The hinges 114, being locally thinned, may produce this condition, and thus when the hinges 114 are curved or "scalloped" one way, they have been found to cool and shrink in a manner that causes the flap 110 to have the tendency to pivot away from the body 104 and toward the "open" position. On the other hand, when the hinges 114 are reversed, the opposite effect has been found to occur, urging the flap 110 toward the body 104 and maintaining the "closed" position.

Figure 2:
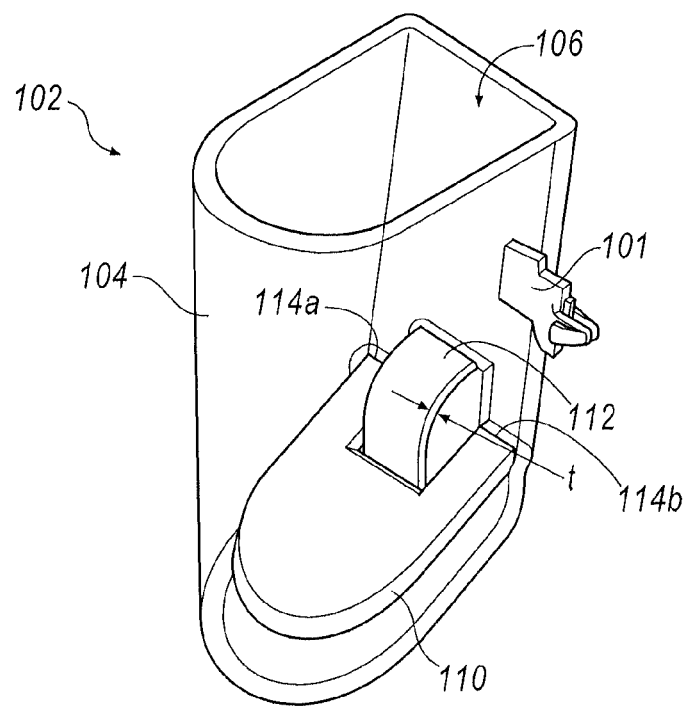
FIG. 2 illustrates a close-up view of a portion of the exemplary baffle of FIG. 1.

As best seen in FIGS. 2 and 5, the flap 110 may initially be in a closed position where the flap 110 substantially obstructs the passage 106. The obstruction of the passage 106 may effectively attenuate or substantially inhibit passage of noise through the pillar structure 100 (not shown in FIGS. 2 and 5), across any frequency ranges that may be desired. In examples where the flap 110 is formed integrally with the body 104, the flap 110 may be initially formed in the closed position.

As noted above, the flap 110 may be pivotable with respect to the body 104 about hinges 114. A biasing element 112 may be provided that generally biases or urges the flap 110 to the closed position. At the same time, the biasing element 112 may advantageously allow selective opening of the flap 110 to permit insertion of the hose 200 or other line. Moreover, the biasing element 112 may be sufficiently elastically deformable to allow a number of opening/closing cycles of the flap 110 while still providing sufficient biasing force to urge the flap 110 into the closed position upon removal of the hose 200.

Accordingly, during assembly the baffles may be generally universally be installed in all vehicles in a given assembly facility, regardless of whether a hose 200 or other line is intended for installation into all of the vehicles. The baffle 102 may effectively attenuate noise transmission through the pillar structure 100 in vehicles where no hose 200 is installed. More specifically, the expanded material 108 (shown prior to expansion in FIGS. 1-5) may substantially fill a cross-section of the pillar structure 100, save for the passage 106, about which the expanded material 108 is positioned. The flap 110 effectively prevents transmission of noise through the passage 106 by reflecting or blocking the noise, or forcing the noise to travel an undulating or tortuous path through the baffle 102.

By contrast, where it is necessary to install a hose 200 or other line into the pillar structure 100 and through the baffle 102, the flap 110 is selectively opened by the insertion of the hose 200. Moreover, the expandable material 108 is prevented from filling the entire cross-section of the cavity by the body 104. The body 104 may define enough cross-sectional width to receive the hose 200 with only a small clearance, such that a small gap, at most, extends about the hose 200. Noise transmission through the pillar structure 100 may therefore be substantially attenuated by the baffle 102, even when the flap 110 is opened to receive the hose 200. The restoring force of the biasing element 112 may thereby allow use of the baffle 102 in a wide variety of vehicle configurations, including non-uniform vehicle production runs where only some vehicles must have a hose 200 or other line to be installed into a pillar structure 100.

The biasing element 112 may also be easily configurable in a number of ways to allow adjustment of operation of the flap 110 for different vehicles. For example, a restoring or biasing force of the biasing element 112 may be determined at least in part from certain mechanical features of the biasing element 112. For example, as best seen in FIGS. 2 and 4, where a thickness t of the biasing element 112 is larger, the biasing force urging the flap 110 into a closed position will be greater. Similarly, where a width a (see FIG. 3) is larger, the biasing force imparted by the biasing element 112 will also be greater.

Figure 3:
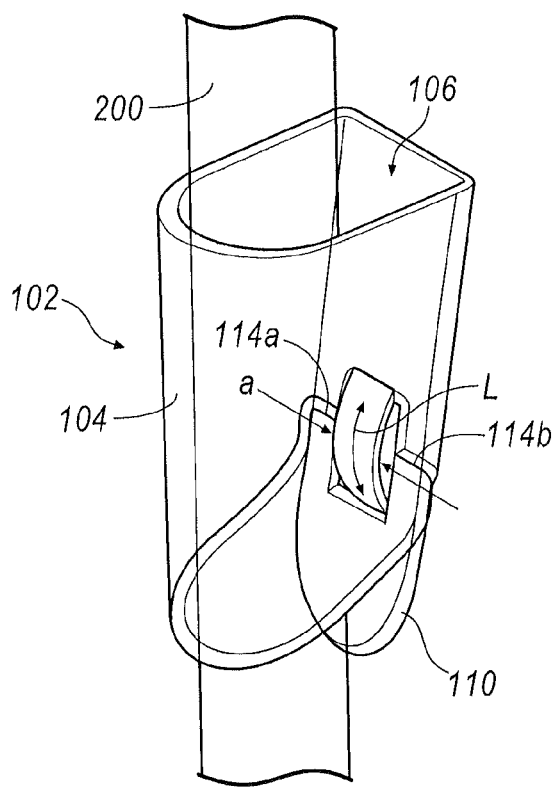
FIG. 3 illustrates a perspective view of the exemplary baffle of FIGS. 1 and 2 in an open position allowing receipt of a hose or line.

Additional features of the baffle 102 may lend themselves to customization for a given application. For example, as best seen in FIG. 3, a length L of the biasing element 112 may be defined by the extension of the biasing element 112 between the relatively rigid parts including the body 104 at one end, and the flap 110 at the other. The length L may generally be greater than an absolute distance between the body 104 and the flap 110, and may allow movement of the flap 110 due to an elasticity of the biasing element 112. The biasing element 112 may define a generally curved shape, e.g., as shown in FIGS. 1-5, or may define an irregular shape with one or more folds, reversals, or other undulations as described further below.

Where the biasing element length L is greater, the biasing element 112 may generally remain in the lower range of elastic behavior allowing more consistent performance of the biasing element 112 over a larger number of opening/closing cycles. By contrast, where the biasing element length L is smaller, the biasing element 112 may function closer to the plastic range and increase the onset of fatigue. While it is desirable to maintain the operation of the biasing element 112 within the elastic range with a longer biasing element length L, a shorter length L also is less complex to form and lowers tooling cost. Accordingly, these competing considerations may need to be balanced for each particular application.

As best seen in FIG. 5, the flap 110 may define an overhang d with respect to the adjacent end of the body 104. In other words, in the baseline closed position in which the biasing element 112 tends to maintain the flap 110 absent insertion of a hose 200, the body 104 extends beyond the flap 110 about a perimeter of the flap 110 by the distance d. The overhang distance may allow a large number of opening/closing cycles of the flap 110 without degradation in acoustic performance that might otherwise result from fatigue or relaxation in the biasing element 112. More specifically, although some fatigue may necessarily occur in the biasing element 112 after opening/closing the flap 110, exposure to heating/cooling cycles, etc., the overhang distance d may advantageously surround the flap 110 despite fatigue of the biasing element 112, at least to the extent the fatigue is not so great that the body 104 no longer surrounds the flap 110. Accordingly, a greater overhang distance d may allow for increased resistance to performance degradation due to fatigue in the biasing element 112.

As best seen in FIG. 4, the chamfered end 103 may substantially define a plane that is angled with respect to a second plane perpendicular to a direction of insertion I of the hose 200. A greater angle θ may allow for full insertion of the hose 200 with less rotation of the flap 110, thereby reducing the movement required of the flap 110 to permit insertion of the hose 200. Accordingly, installation may be simplified to the extent a hose 200 is desired to require minimal engagement with the flap 110.

As noted above, the body 104, including the biasing element 112, the flap 110, and hinges 114 may be integrally formed of a plastic or nylon material. In one exemplary illustration, the body is formed of any heat resistant type of common plastic, e.g., a polyamide material such as polyamide 6, polyamide 6,6, polyamide 11, polyamide 12 or a mixture of these materials. The expression "heat resistant," in one exemplary illustration, means that the material is completely resistant to melting due to a temperature associated with application of heat sufficient to activate expansion of the expandable material 108 and/or with a paint baking process associated with the vehicle. In one exemplary illustration, such a temperature range is between approximately 130 degrees Celsius to 210 degrees Celsius.

The expandable sealing material 108 may have an activation temperature corresponding to the expansion of said material, e.g., in the range of between 130 degrees Celsius and 210 degrees Celsius. In one exemplary illustration, the sealing material is heat expandable, foaming polyethylene and/or Ethyl-Vinylacetate-Copolymer (EVA). In another exemplary illustration, expandable material 108 has an expansion rate between approximately 400% and 1000%.

Exemplary expandable materials may include, merely as examples, a baffle material available under the name Sika-Baffle, e.g., SikaBaffle SB250NT, SikaBaffle SB250, Sika-Baffle SB255, SikaBaffle SB250PB2, or SikaBaffle SB250PB3.

Expandable materials of the kind introduced above may expand or foam under the influence of heat. Some exemplary thermally foamable materials are further described in U.S. Pat. Nos. 5,266,133 and 5,373,027, whose disclosures are hereby incorporated by reference in their entireties. It is of course also possible to use other expandable materials, which may be activated by external heat sources or internal heat sources, such as by an exothermic reaction, for example.

Figure 6:
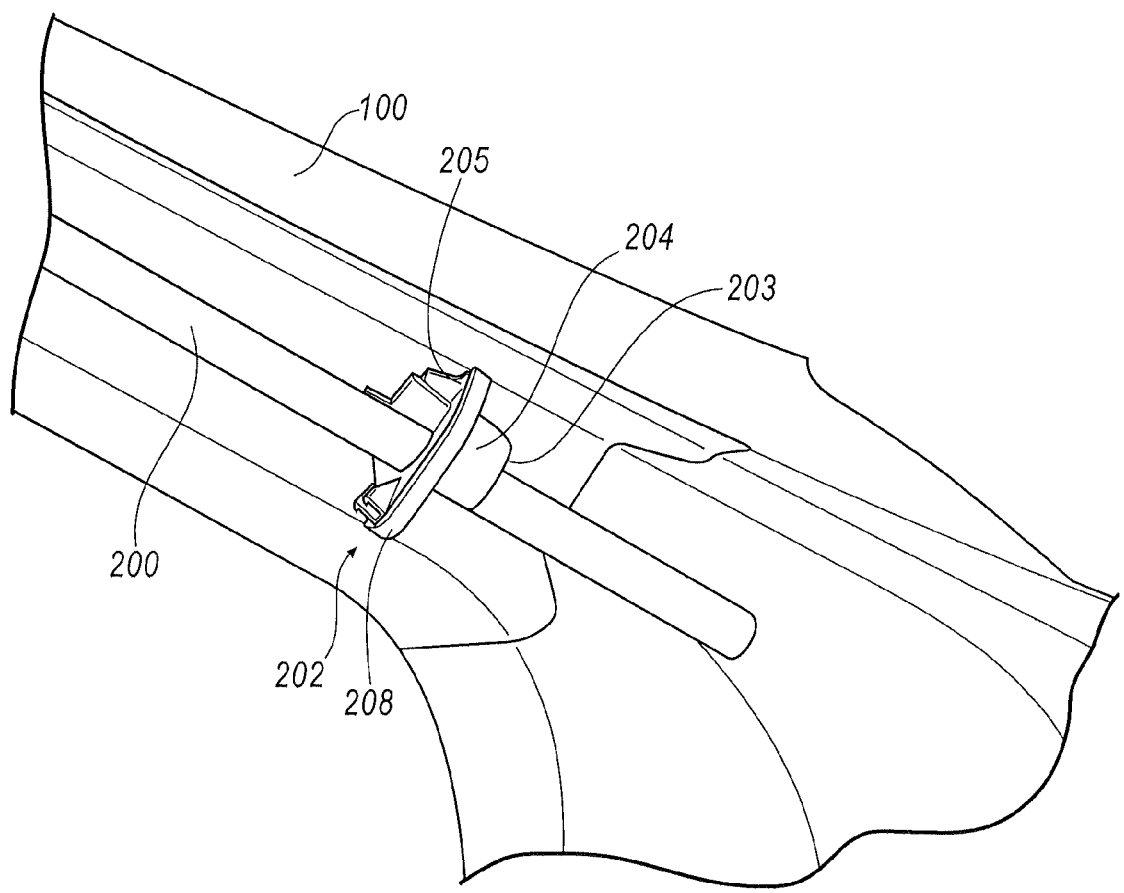
FIG. 6 illustrates a partial cutaway perspective view of another exemplary self-closing expandable baffle.
Figure 7:
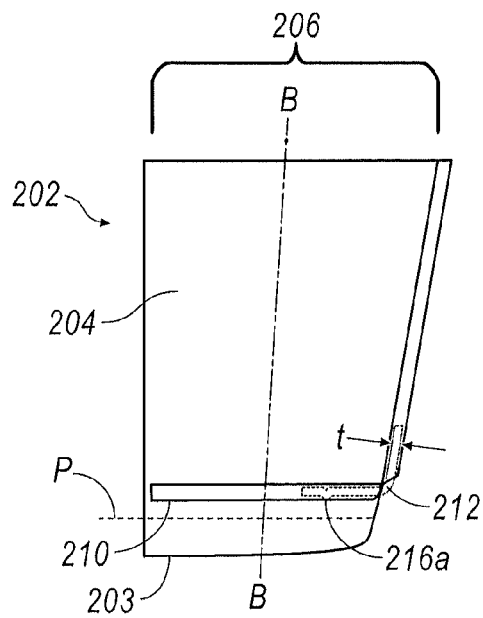
FIG. 7 illustrates a side view of the exemplary baffle of FIG. 6 in a closed position wherein a passage of the baffle is obstructed.
Figure 8:
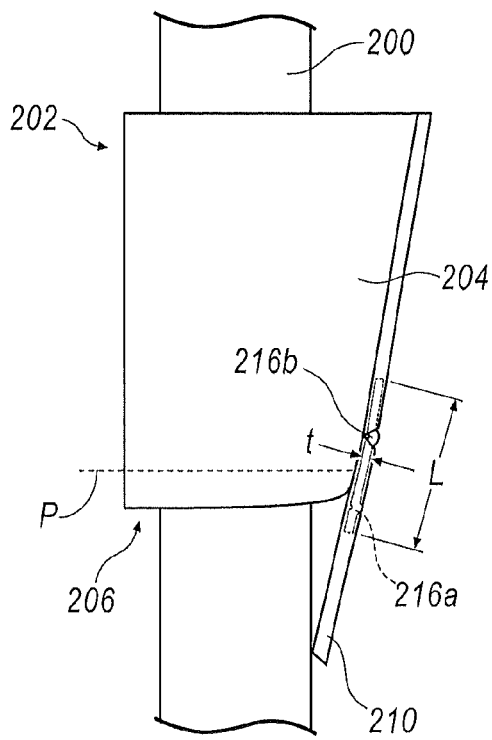
FIG. 8 illustrates a side view of the exemplary baffle of FIGS. 6 and 7 in an open position allowing receipt of a hose or line.

Turning now to FIGS. 6-8, another exemplary baffle 202 is illustrated. The baffle 202 is substantially similar to baffle 102 described above, inasmuch as it includes a body 204 extending between a flange 205 and distal end 203. The body 204 defines a passage 206 for selectively receiving a hose 200. The distal end 203 is selectively closed by a flap 210, which may be biased into a closed position (see FIG. 7) by spring or biasing element 212. An expandable material 208 is secured about the flange 205, as shown in FIG. 6.

As noted above regarding baffle 102, the biasing element 212 of the baffle 202 may define a biasing element length L, e.g., as generally defined by the extension of the biasing element 212 between the relatively rigid parts including the body 204 at one end, and the flap 210 at the other, as best seen in FIG. 8. Where the biasing element length L is greater, the biasing element 112 may generally remain in the lower range of elastic behavior allowing more consistent performance of the biasing element 112 over a larger number of opening/closing cycles, as noted above.

As best seen in FIGS. 6 and 7, the biasing element 212 of baffle 202 defines a generally irregular shape along the biasing element length L that includes two undulations 216a, 216b. The undulations 216 generally increase the overall biasing element length L, thereby allow for increasing the biasing element length L where space for the biasing element 212 is at a premium, e.g., where pillar structure 100 is particularly narrow or where drain hose 200 is of a relatively large size. Any irregularity, fold, reversal, or other deviation of the biasing element 212 shape from a straight line may be employed to allow for a greater biasing element length L.

The baffle 202 may also define a substantially "flat" distal edge 203, in contrast to the chamfered end 103 of baffle 102. The edge 203 may thereby substantially define a plane P that is positioned to improve forming of the edge 203 in an injection molding process. More specifically, in one exemplary illustration, the body 204 is formed in an injection molding process where material flows along the body 204 and toward the edge 203, in a direction generally perpendicular to the plane P. Alignment of the edge 203 in this manner may thereby promote uniform formation of the edge 203 as the molded material may reach the edge 203 in a uniform manner about the perimeter of the baffle 204. In the exemplary illustration shown in FIGS. 6-8, the plane P may be substantially parallel with flange 205, or may be substantially perpendicular to an axis B-B of the passage 206 of the baffle 202. The uniform formation of the edge 203 in the body 204 is another example how a baffle 202 may generally facilitate high volume production at a consistent level of quality over the life cycle of the end-consumer baffle product for which it is purchased (i.e., the vehicle). In other words, it is necessary in a mass manufacturing environment to be able to able maintain the production volume without prohibitive production or tooling and/or production maintenance cost overruns.

Figure 9:
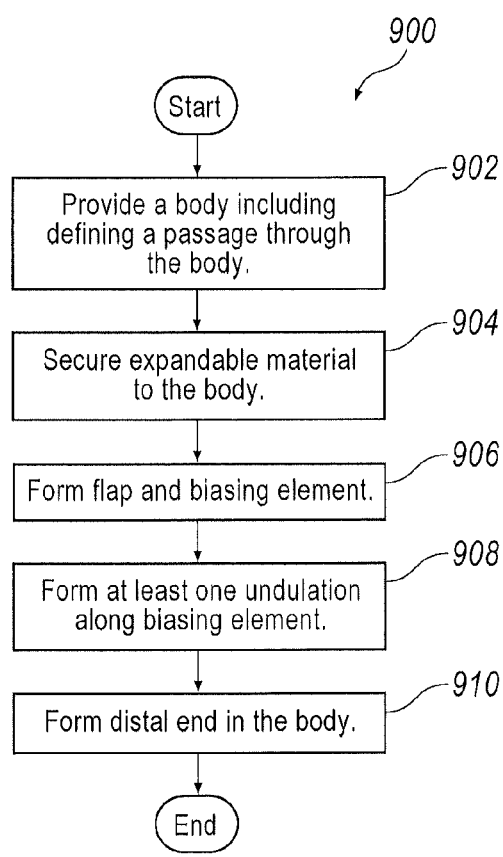
FIG. 9 illustrates a process flow diagram for an exemplary method of forming an expandable baffle.

Turning now to FIG. 9, an exemplary process flow diagram is illustrated for an exemplary method of forming a baffle. Process 900 may begin at block 902, where a body is provided that is configured to be secured in a cavity. The body may include a passage extending through the body for selectively receiving a line. For example, as described above a body 104, 204 may be provided having a passage 106, 206 for receiving a drain hose 200. The body may be formed in any process that is convenient, e.g., injection molding. Process 900 may then proceed to block 904.

At block 904, an expandable material may be secured to the body. For example, as described above, an expandable material 108, 208 may be secured substantially about a perimeter of the body 104, 204 such that the expandable material is configured to expand to seal the cavity about the body 104, 204. The expandable material 108, 208 may be formed in any process that is convenient, such as an injection molding process. Moreover, where other parts of the baffle, e.g., body 104, 204 or portions thereof, are being injection molded of a different material, the expandable material 108, 208 may advantageously be co-injected along with the other parts of the baffle 102, 202. In another exemplary illustration, the expandable material 108, 208 may be overmolded onto the body 104, 204, and any other known injection molding or other forming process may be employed.

Proceeding to block 906, a flap and biasing element may be formed in the body. The flap may be configured to open to allow the line to extend through the passage, with the biasing element urging the flap toward a closed position substantially obstructing the passageway. For example, as described above a flap 110, 210 and biasing element 112, 212 may each be injection molded integrally with body 104, 204 of a heat resistant material. More specifically, in an exemplary illustration the heat resistant material may resist melting or other deformation at temperatures associated with an elevated temperature used to activate the expandable material 108, 208. Process 900 may then proceed to block 908.

At block 908 at least one undulation may be formed along a length of the biasing element. For example, as described above undulations 216a, 216b may be provided to locally stiffen biasing element 212, thereby improving a resistance of the flap 210 to fatigue that might otherwise prevent the flap 110 from returning to the baseline closed position after a number of opening/closing cycles.

Proceeding to block 910, a distal end or edge of the body may be formed such that the distal end defines a plane substantially perpendicular to a direction of material flow along the body. In one example, a distal edge 203 substantially defines a plane P that is generally perpendicular to an axis B-B of the passageway 206. Accordingly, when material flows along the passageway 206 during the injection molding process used to form the body 104, molding material is more likely to arrive at the distal edge 203 simultaneously and in a homogenous fashion, resulting in improved quality and forming of the body 104.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A baffle, comprising:
   a body configured to be secured in a cavity, the body defining a passage for selectively receiving a line extending through the body; and
   an expandable material extending substantially about a perimeter of the passage, the expandable material configured to expand to seal the cavity about the body;
   wherein the body includes a flap configured to open to allow the line to extend through the passage, the body further including a biasing element urging the flap toward a closed position substantially obstructing the passageway.

2. The baffle of claim 1, wherein the expandable material expands upon application of heat.

3. The baffle of claim 2, wherein the expandable material has an expansion temperature from approximately 130 degrees Celsius to approximately 210 degrees Celsius.

4. The baffle of claim 2, wherein the expandable material is one of a foaming polyethylene and an Ethyl-Vinylacetate-Copolymer (EVA).

5. The baffle of claim 1, further comprising an attachment member configured to secure the baffle within the cavity prior to expansion of the expandable material.

6. The baffle of claim 1, wherein the body, including the flap and the biasing element, is integrally formed of a heat resistant plastic material.

7. The baffle of claim 6, wherein the heat-resistant plastic material includes a polyamide.

8. The baffle of claim 6, wherein the expandable material is co-injected with the body.

9. The baffle of claim 1, wherein the flap is connected to the body with a living hinge.

10. The baffle of claim 1, wherein the body is elongated to guide the introduction of one of a drain tube and a line into the passage from a distance from the body.

11. The baffle of claim 1, wherein the biasing element extends from the body to the flap to define a biasing element length.

12. The baffle of claim 11, wherein the biasing element length is greater than an absolute distance between the body and the flap.

13. The baffle of claim 12, wherein the biasing element includes at least one undulation along the biasing element length.

14. The baffle of claim 1, wherein the body includes a flange supporting the expandable material, the body including a distal end opposite the flange, the distal end defining a plane substantially parallel to the flange.

15. A method, comprising:
providing a body configured to be secured in a cavity, including defining a passage extending through the body for selectively receiving a line;
securing an expandable material about a perimeter of the passage, the expandable material configured to expand to seal the cavity about the body; and
forming a flap and biasing element in the body, the flap configured to open to allow the line to extend through the passage, the biasing element urging the flap toward a closed position substantially obstructing the passageway.

16. The method of claim 15, further comprising establishing the expandable material as expandable upon application of heat.

17. The method of claim 15, wherein forming the body, the flap and the biasing element includes integrally forming the body, the flap and the biasing element of a heat resistant plastic material.

18. The method of claim 17, wherein securing the expandable material to the body includes co-injecting the expandable material with the body.

19. The method of claim 15, further comprising forming at least one undulation along a length of the biasing element, the biasing element length extending from the flap to the body.

20. The method of claim 15, further comprising forming a distal end in the body such that the distal end defines a plane substantially perpendicular to an axis of the passageway.

* * * * *